United States Patent
Heidrich

(10) Patent No.: US 10,654,197 B2
(45) Date of Patent: May 19, 2020

(54) METHOD AND DEVICE FOR CLEANING A MOLDING SURFACE OF A REUSABLE LENS MOLD

(71) Applicant: Novartis AG, Basel (CH)

(72) Inventor: Halina Heidrich, Kahl am Main (DE)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/406,170

(22) Filed: May 8, 2019

(65) Prior Publication Data

US 2019/0263026 A1   Aug. 29, 2019

Related U.S. Application Data

(62) Division of application No. 15/187,245, filed on Jun. 20, 2016, now Pat. No. 10,328,612.

(60) Provisional application No. 62/182,927, filed on Jun. 22, 2015.

(51) Int. Cl.
| | |
|---|---|
| *B29C 33/72* | (2006.01) |
| *B08B 3/02* | (2006.01) |
| *B08B 9/00* | (2006.01) |
| *B29D 11/00* | (2006.01) |

(52) U.S. Cl.
CPC .............. *B29C 33/72* (2013.01); *B08B 3/02* (2013.01); *B08B 3/022* (2013.01); *B08B 9/00* (2013.01); *B29D 11/00125* (2013.01); *B08B 2240/00* (2013.01); *B29D 11/00519* (2013.01)

(58) Field of Classification Search
None
See application file for complete search history.

(56) References Cited

U.S. PATENT DOCUMENTS

| | | | |
|---|---|---|---|
| 6,113,817 A * | 9/2000 | Herbrechtsmeier | ........................ B29D 11/0023 264/1.1 |
| 2008/0196748 A1* | 8/2008 | Tobin | ....................... B08B 3/022 134/32 |

\* cited by examiner

*Primary Examiner* — Cristi J Tate-Sims
(74) *Attorney, Agent, or Firm* — Sheng-Hsin Hu

(57) ABSTRACT

A method for cleaning a molding surface (51) of a reusable lens mold (5), in particular of a reusable lens mold (5) for molding ophthalmic lenses such as soft contact lenses, comprising the steps of:
  generating a jet (3) of deionized water,
  exposing the molding surface (51) of the reusable lens mold (5) to the jet (3) of deionized water,
wherein the jet (3) of deionized water has a circular full cone spray pattern and impinges on the molding surface (51) of the reusable lens mold (5), and wherein the circular full cone spray pattern has a uniform distribution of the volume flow of deionized water over the base of the cone of the circular full cone spray pattern.

3 Claims, 3 Drawing Sheets

METHOD AND DEVICE FOR CLEANING A MOLDING SURFACE OF A REUSABLE LENS MOLD

This application is a division of U.S. patent application Ser. No. 15/187,245, filed Jun. 20, 2016, which claims benefit under 35 U.S.C. § 119(e) of U.S. provisional patent application No. 62/182,927, filed on Jun. 22, 2015, whose disclosures are incorporated herein by reference in its entirety

FIELD OF THE INVENTION

The invention relates to a method for cleaning a molding surface of a reusable lens mold, in particular of a reusable lens mold for molding ophthalmic lenses such as soft contact lenses. The invention also relates to an apparatus for carrying out the method.

BACKGROUND OF THE INVENTION

Mass production of ophthalmic lenses, in particular of contact lenses such as soft contact lenses, is usually performed in a fully automated process. In an embodiment of this fully automated process the soft contact lenses are manufactured with the aid of reusable molds comprising male and female molds. In one processing station, a lens forming material is introduced into the female mold. Lens forming materials that may be useful in such process are, for example, lens forming materials based on polyvinyl alcohols (PVA) or lens forming materials based on silicone hydrogels (SiHy). After introduction of the lens forming material into the female mold, the female mold is mated in a subsequent processing station with a corresponding male mold to form a mold cavity defining the shape of the soft contact lens to be formed. In a yet further subsequent processing station, the lens forming material within the mold cavity is polymerized and/or cross-linked, for example by irradiation with ultraviolet radiation (UV-radiation) to form the soft contact lens.

The polymerization/cross-linking process by irradiation with UV-radiation may be performed using molds in which the mold cavity of the mated male and female molds is not completely sealed but is connected by a small annular gap to a reservoir surrounding the mold cavity. During the polymerization/cross-linking process, excess lens forming material contained in the reservoir surrounding the mold cavity is allowed to flow from the reservoir through the small annular gap into the mold cavity to compensate for a shrinkage in volume which may occur during polymerization/cross-linking of the lens forming material with the aid of UV-radiation. An annular metallic mask may be arranged at the radially outer boundary of the molding surface of the male mold.

The annular metallic mask, in particular a chromium mask which may have been applied to the male mold through deposition of a chromium coating, shields those portions of the lens forming material which are not to be exposed to UV-radiation, so that the mask accurately delimits the space where the lens forming material enclosed between the mated male and female molds is exposed to UV-radiation to allow for a precise definition of the geometry of the lens edge of the soft contact lens to be formed.

After exposure to UV-radiation, the mold is opened through separation of the male and female molds, the soft contact lens formed is removed from the male or female mold, respectively, and may subsequently be transported to additional processing stations.

Once the contact lens has been removed from the male or female mold, the molds used in the production of the soft contact lens are cleaned and rinsed through exposure to cleaning and rinsing liquid jets. Cleaning and rinsing liquids comprise, for example, water or water mixed with organic solvents to remove from the used mold halves any debris such as residual lens forming material adhering to the mold, as well as deionized water for a final rinsing step. Thereafter, the cleaned and rinsed molds are dried in order to be ready for use in the next production cycle.

As has been outlined above, mass production of ophthalmic lenses includes the use of reusable molds. The reusable molds, or at least those parts thereof comprising the molding surfaces, are typically made from optically finished glass, for example quartz glass. Such reusable molds are particularly advantageous since they are transparent to UV-radiation, they are durable, they can be cleaned and rinsed after molding of a soft contact lens for subsequent re-use, etc. Due to the optical quality of the molding surfaces and the required accuracy of the chromium mask defining the geometry of the lens edge of the soft contact lens which is important for the wearing comfort, these molds or mold halves are rather expensive.

As has been indicated, such molds are used in mass production of soft contact lenses so that they are used in very high numbers of subsequent production cycles before they are replaced. However, after such a high number of production cycles it may occur that the chromium mask may slowly be degraded by the high number of cleaning and rinsing steps in which the chromium mask is exposed to the jets of deionized water. After a certain number of production cycles, it may occur that the mask is degraded to an extent that the accuracy of the mask is no longer sufficient to maintain the high level of accuracy required for the lens edge, so that the mold has to be replaced.

Due to the molds or mold halves being rather expensive, it is an object of the invention to increase the number of production cycles the molds can stand while maintaining the high level of accuracy required for the lens edge, and at the same time the molding surface of the mold halves must be reliably cleaned and rinsed before it is re-used.

SUMMARY OF THE INVENTION

These and other objects of the invention are achieved with a method and an apparatus as specified by the features of the respective independent claims. Advantageous aspects of the method and apparatus according to the invention are the subject of the dependent claims.

In accordance with the invention, the method for cleaning a molding surface of a reusable lens mold, in particular of a reusable lens mold for molding ophthalmic lenses such as soft contact lenses, comprises the steps of:
generating a jet of deionized water,
exposing the molding surface of the reusable lens mold to the jet of deionized water,
wherein the jet of deionized water has a circular full cone spray pattern and impinges on the molding surface of the reusable lens mold, and wherein the circular full cone spray pattern has a uniform distribution of the volume flow of deionized water over the base of the cone of the circular full cone spray pattern.

According to one aspect of the method according to the invention, the reusable lens mold comprises an annular metallic mask, in particular a chromium mask, which is arranged at a radially outer boundary of the molding surface.

According to a further aspect of the method according to the invention, the reusable lens mold is transported through the jet of deionized water along a linear transport path.

According to a still further aspect of the method according to the invention, a plurality of jets of deionized water are linearly arranged at fixed locations, and wherein the reusable lens mold is transported through the plurality of jets along the linear transport path which extends along the linear arrangement of the plurality of jets.

According to yet a further aspect of the method according to the invention, an apex of the molding surface of the reusable lens mold on one hand and a discharge orifice from which the jet of deionized water having the full cone spray pattern is ejected on the other hand are arranged to be spaced by a predetermined impact distance.

According to a further aspect of the method according to the invention, the predetermined impact distance is in the range of 15 mm to 35 mm (millimeters).

In accordance with a further aspect of the method according to the invention, the jet has a cone angle in the range of 80° to 100°.

In accordance with still a further aspect of the method according to the invention, a flow rate of deionized water at a pressure of $4 \cdot 10^5$ Pa is in the range of 0.40 l/min to 0.60 l/min (liters per minute).

In accordance with yet a further aspect of the method according to the invention, the jet is generated with the aid of a full cone nozzle.

According to a further aspect of the method according to the invention, the reusable lens mold is transported along the linear transport path at a velocity in the range of 100 mm/s to 200 mm/s (millimeters per second).

According to a still further aspect of the method according to the invention, the individual jets of the plurality of linearly arranged jets are arranged in a manner such that the impact areas of adjacently arranged individual jets do not overlap at the predetermined impact distance.

Also in accordance with the invention, the apparatus for cleaning a molding surface of a reusable lens mold, in particular of a reusable lens mold for molding ophthalmic lenses such as soft contact lenses, comprises:

at least one full cone nozzle for generating a jet of deionized water having a circular full cone spray pattern having a uniform distribution of the volume flow of deionized water over the base of the cone of the circular full cone spray pattern, a positioning device for arranging the reusable lens mold relative to the full cone nozzle such that the molding surface of the reusable lens mold is exposed to the jet of deionized water.

According to one aspect of the apparatus according to the invention, a plurality of full cone nozzles are linearly arranged at fixed locations, and the positioning device comprises a transportation device for linearly transporting the reusable lens mold along a linear transport path which extends along the plurality of linearly arranged full cone nozzles.

According to a further aspect of the apparatus according to the invention, the discharge orifice of the respective individual full cone nozzle of the plurality of linearly arranged full cone nozzles on one hand and the apex of the molding surface of the reusable lens mold on the other hand are arranged at a predetermined impact distance. The individual full cone nozzles of the plurality of linearly arranged full cone nozzles are arranged such that in operation the circular full cone spray patterns of the individual full cone nozzles of the linearly arranged full cone nozzles do not overlap at the predetermined impact distance.

It is to be noted that generally, that generally any of afore-described features or aspects of the invention can be combined with any other afore-described feature or aspect of the invention as long as such combination is not mutually exclusive.

The circular full cone spray pattern, as its name says, has the shape of a cone having a circular base. The afore-described uniform distribution of the volume flow of deionized water over the base of the cone of the circular full cone spray pattern allows for a reliable cleaning/rinsing of the mold on one hand while at the same time enhancing the number of production cycles the mold can stand before it must be replaced. Therefore, a considerably higher number of lenses having lens edges of a high level of accuracy can be produced with the mold, in particular when using a re-usable mold having an annular metallic mask arranged thereon to define the geometry of the lens edge. The circular full cone spray pattern is a pattern that has the shape of a cone having a circular base. A uniform distribution of the volume flow over the base of the cone of the full cone spray pattern in this connection means that the variation of the volume flow over the base of the cone of the full cone spray pattern is less than 15%. Reusable molds are typically made of an optically finished glass, for example quartz glass. While generally the method and apparatus according to the invention can also be used for a mold not having a metallic mask applied thereto, they are particularly suitable for a mold having such metallic mask applied thereto, in particular a chromium mask. The uniform distribution of the volume flow of deionized water of the circular full cone spray pattern leads to a gentle and a the same time effective cleaning and rinsing of the molding surface of the mold as well as to a significantly reduced degradation of the chromium mask when compared to other spray patterns. Circular full cone spray patterns may advantageously be generated using full cone nozzles (for example axial-flow full cone nozzles or tangential-flow full cone nozzles) which are available on the market.

To render the method and apparatus according to the invention even more effective, on or more molds can be transported through one or more jets of deionized water, and in case of a plurality of jets are present these may be linearly arranged at fixed locations along a linear transport path, so that each mold is transported through the individual jets of deionized water when being transported along the linear transport path. Advantageously, the individual jets are arranged in a manner such that they do not overlap when the apex of the molding surface of the mold is arranged at a predetermined impact distance which is the distance between a discharge orifice from which the individual jet is ejected and the apex of the molding surface of the mold. Such impact distance may, for example, be in the range of 15 mm to 35 mm.

BRIEF DESCRIPTION OF THE DRAWINGS

Further advantageous aspects of the invention become apparent from the following description of embodiments of the invention with the aid of the drawings in which.

DETAILED DESCRIPTION OF EMBODIMENTS

Figure 1:
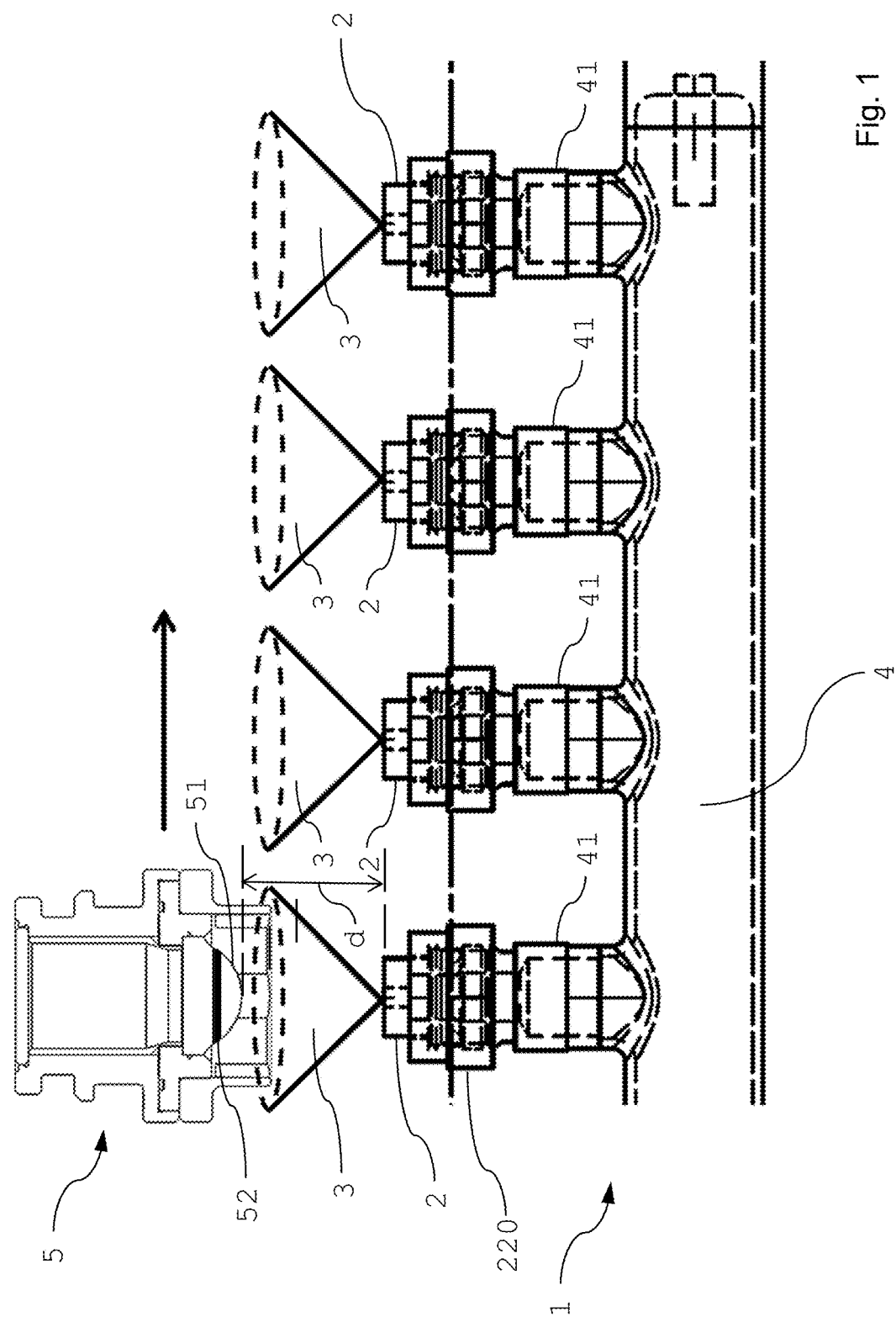
FIG. 1 is a schematic view of essential components of an embodiment of an apparatus according to the invention comprising a plurality of linearly arranged full cone nozzles, and a male mold being arranged at a predetermined impact distance relative to the discharge orifice of the full cone nozzles.

FIG. 1 shows essential components of an embodiment of an apparatus according to the invention for cleaning a molding surface 51 of a reusable lens mold 5, in the embodiment shown of a reusable male mold 5 for molding an ophthalmic lens such as a soft contact lens. The apparatus comprises a spray system 1 comprising a plurality of linearly arranged full cone nozzles 2, in the embodiment shown in FIG. 1 four such full cone nozzles 2 are shown by way of example. The full cone nozzles 2 are preferably of the type axial-flow full cone nozzle and are available from the company Lechler GmbH, Ulmer Str. 128, DE-72555 Metzingen, Germany, although alternatively nozzles of the type tangential-flow full cone nozzle may be used as well. The reusable male mold 5 shown in FIG. 1 comprises an annular metallic mask 52 (e.g. chromium mask) arranged at and/or forming the radially outer boundary of a molding surface 51 of the reusable male mold 5.

The reusable male mold 5 shown in FIG. 1 has been used in a soft contact lens molding process and must now be cleaned and dried before it can be re-used for molding the next lens. Cleaning of the male mold 5 may comprise several cleaning steps and a final rinsing step in which the male mold 5 is exposed to deionized water after it has been cleaned in one or more preceding cleaning steps in which liquids other than deionized water are typically used which are less aggressive to the chromium mask than is deionized water. However, at least in the final rinsing step deionized water is used. After the final rinsing step, the mold is dried and is ready for being reused.

For the final rinsing step, the reusable male mold 5 is transported to the spray system 1 comprising the plurality of linearly arranged full cone nozzles 2. Similarly, the corresponding reusable female mold may be cleaned/rinsed in a similar manner (although not being provided with a chromium mask). For the sake of simplicity in the following only the cleaning/rinsing of the reusable male mold 5 comprising the chromium mask 52 will be described in more detail making reference to the final rinsing step in which deionized water is used. In the embodiment shown in FIG. 1, the full cone nozzles 2 of the spray system 1 are linearly arranged at fixed locations along a common supply pipe 4 and are connected to the common supply pipe 4 to in operation generate four individual jets 3 of deionized water. Each individual jet 3 of deionized water has a circular full cone spray pattern as can be seen from FIG. 1 in which the base of the cone is also indicated schematically. As the reusable male mold 5 is transported (using a suitable transportation device, not shown) along a linear transport path (indicated by the arrow shown in FIG. 1) which extends along the linearly arranged full cone nozzles 2, the molding surface 51 bounded by the chromium mask 52 of the reusable male mold 5 is successively impacted by the jets 3 of deionized water ejected from the full cone nozzles 2. The (lateral) distance between the discharging orifices 23 of adjacently arranged full cone nozzles 2 may, for example, be in the range of 30 mm to 60 mm, and may in particular be 40 mm.

Transportation of the reusable male mold 5 may be performed at a velocity in the range of 100 mm/s to 200 mm/s, for example this velocity may be 180 mm/s.

The jet 3 created by the respective individual full cone nozzles 2 preferably has a cone angle α which may, for example, be in the range of 80° to 100°, and may in particular be 90°. The impact distance d (FIG. 1), that is to say the distance between the discharge orifice 23 (see FIG. 3) of the full cone nozzle 2 and the apex of the molding surface 51 of the reusable male mold 5 may generally be in the range of 15 mm to 25 mm, more particularly in the range of 15 mm to 25 mm, and may in for example be 22.5 mm. By way of example, the flow rate of deionized water through the individual full cone nozzles 2 at a pressure of $4 \cdot 10^5$ Pa (corresponding to a pressure of 4 bars) may be in the range of 0.40 l/min (liters per minute) to 0.60 l/min. By way of example, too, the deionized water may be supplied to the respective full cone nozzles 2 at a pressure which is in the range of $1 \cdot 10^5$ Pa to $6 \cdot 10^5$ Pa (corresponding to 1 to 6 bars), particularly at a pressure of $2.5 \cdot 10^5$ Pa (2.5 bars). In particular, the amount of liquid per area and per minute may be selected to be smaller than 1 ml per minute and per square millimeter (1 ml/min·mm$^2$) at a pressure of 4 bars and at an impact distance of 15 mm.

As has been mentioned already, in operation the full cone nozzles 2 are embodied to generate a uniform distribution of the volume flow of deionized water over the base of the cone of the circular full cone spray pattern, so that for example the variation of the volume flow over the entire impact area may be less than 10%. As can be seen from FIG. 1, the full cone nozzles 2 are arranged such that the circular full cone spray patterns generated by adjacently arranged full cone nozzles 2 do not overlap when the mold surface 51 of the male mold 5 is arranged at the above-described impact distance d.

Figure 3:
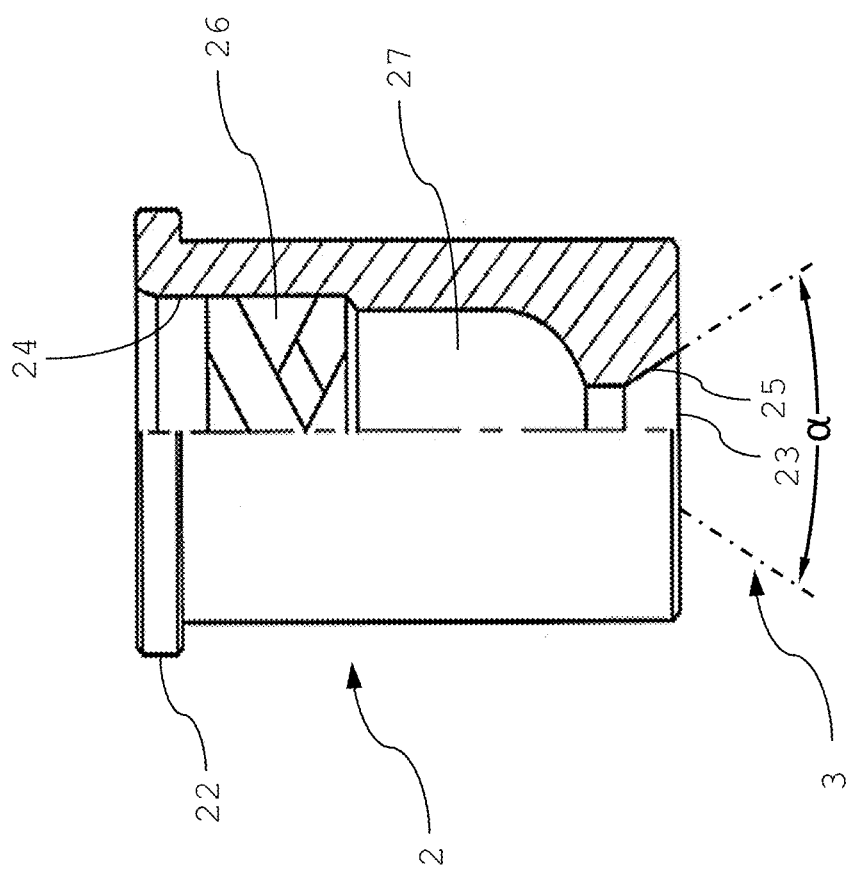
FIG. 3 is a partial longitudinal section of the full cone nozzle shown in FIG. 2.
Figure 2:
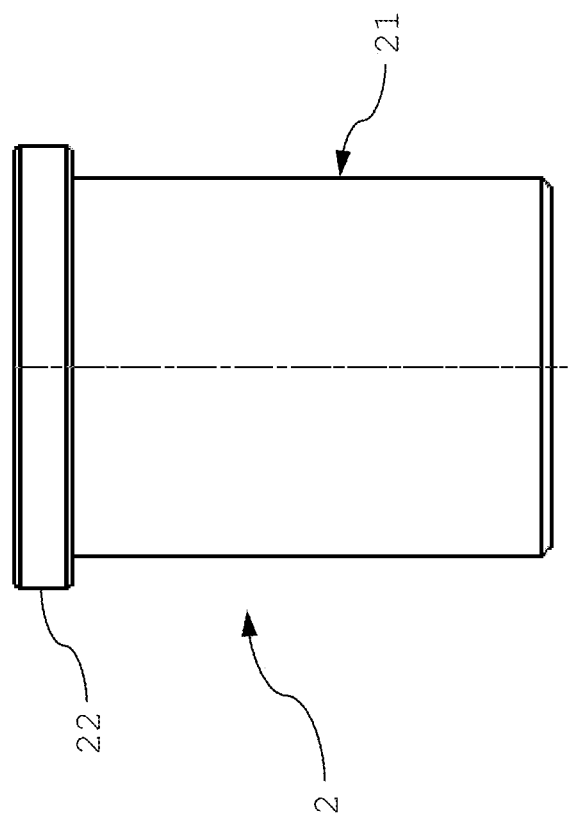
FIG. 2 is a schematic representation of an embodiment of a full cone nozzle suitable for the apparatus and method according to the invention.

A first embodiment of a full cone nozzle 2 suitable for the apparatus and method according to the invention is shown in FIG. 2 and FIG. 3. This embodiment of the full cone nozzle 2 comprises an elongated hollow nozzle body 21 comprising at one end thereof a radially outwardly projecting flange 22, so that with the aid of a retainer nut 220 the nozzle 2 can be screw-mounted onto a connecting spout 41 which in turn is connected (e.g. welded) to the common supply pipe 4.

Figure 4:
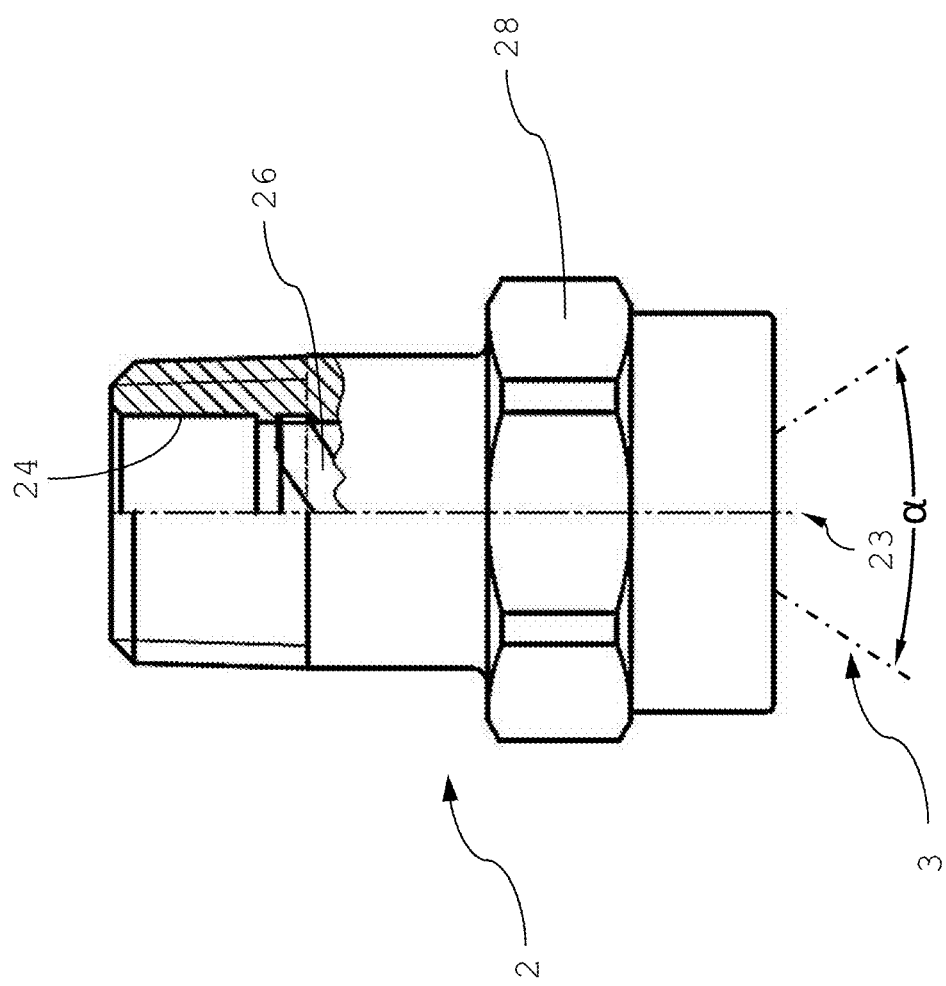
FIG. 4 is a longitudinal section of another embodiment of a full cone nozzle suitable for the apparatus and method according to the invention.

FIG. 4 shows a second embodiment of a full cone nozzle 2 which may be provided with a thread on the outer surface of the nozzle body so that it can be directly screw-mounted to the connecting spout 41 which in turn is connected to the common supply pipe 4. A hex head 28 is provided on the nozzle body allowing for wrench tightening of the full cone nozzle 2 during screw-mounting the nozzle 2 to the connecting spout 41.

The embodiments of the full cone nozzles shown in FIG. 2, FIG. 3, and FIG. 4 allow for an easy replacement, if necessary. In the full cone nozzles 2 shown in FIG. 2, FIG. 3 and FIG. 4, the elongated hollow nozzle body 21 has an axial liquid passageway 24 for communicating with the spout 41. At the discharge orifice 23 located at the downstream end of the nozzle body 21 the full cone nozzle 2 comprises an outwardly extending frustoconical section 25.

Axial-flow full cone nozzles are of the type turbulence nozzle. In a turbulence nozzle, the deionized water rotates through a chamber 27 while proceeding to the discharge orifice 23 of the full cone liquid nozzle 2. Thus, the jet 3 ejected from the discharge orifice has the desired full cone spray pattern.

In the particular case of an axial-flow full cone nozzle 2 shown in longitudinal section in FIG. 3 and FIG. 4, one or more vanes 26 are arranged in the passageway 24 between the upstream end of the nozzle body 21 and the discharge orifice 23 of the full cone liquid nozzle 2. The one or more vanes 26 arranged in the nozzle body 21 impart a swirling movement to the deionized water passing through the nozzle body 21 and breaks up the deionized water flow into liquid droplets which are uniformly distributed over the base of the full cone spray pattern of the jet 3 emitted from the discharge orifice 23 of the full cone liquid nozzle 2. The full cone liquid nozzle 2 thus creates a very uniform liquid spray pattern which is superior to the uniformity of conventional spray nozzles, for example flat jet nozzles.

Other nozzle types are suitable for the generation of a circular full cone spray pattern having a uniform distribution of the volume flow of deionized water over the base of the cone as well such as, for example, tangential-flow full cone nozzles. In a tangential-flow full cone nozzle, the deionized water is typically supplied tangentially to a swirl chamber. Suitable tangential-flow full cone nozzles are available from the company Lechler GmbH, Ulmer Str. 128, DE-72555 Metzingen, Germany, as well.

In operation, in the embodiment illustrated in FIG. 1 the individual jets 3 of deionized water having the full cone spray pattern are ejected from the full cone nozzles 2, with the full cone spray pattern having a cone angle $\alpha$ which is preferably between 80° and 100°, and is particularly 90°. As indicated previously, the full cone liquid nozzles 2 are arranged such that the jets of adjacently arranged full cone nozzles 2 do not overlap at the impact distance d.

By way of example, the full cone nozzle 2 may be made of PVDF (polyvinylidene fluoride), brass, Hastelloy®, Titanium or stainless steel, or of suitable thermoplastic polymeric materials such as, for example, PVC (polyvinyl chloride), polypropylene or Teflon®.

Although the invention has been described with the aid of specific embodiments, it is evident to the person skilled in the art that this embodiment has been described by way of example only and that various changes and modifications are conceivable without departing from the teaching underlying the invention. Therefore, the scope of protection is not intended to be limited by the embodiments described, but rather is defined by the appended claims.

The invention claimed is:

1. Apparatus for cleaning a molding surface of a reusable lens mold for molding soft contact lenses, the apparatus comprising:
at least one full cone nozzle for generating a jet of deionized water having a circular full cone spray pattern having a uniform distribution of the volume flow of deionized water, wherein the shape of a cone having a circular base,
a positioning device for arranging the reusable lens mold relative to the full cone nozzle such that the molding surface of the reusable lens mold is exposed to the jet of deionized water.

2. Apparatus according to claim 1, wherein a plurality of full cone nozzles are linearly arranged at fixed locations, and wherein the positioning device comprises a transportation device for linearly transporting the reusable lens mold along a linear transport path which extends along the plurality of linearly arranged full cone nozzles.

3. Apparatus according to claim 2, wherein a discharge orifice of the respective individual full cone nozzle of the plurality of linearly arranged full cone nozzles and the apex of the molding surface of the reusable lens mold are arranged at a predetermined impact distance (d), and wherein the individual full cone nozzles of the plurality of linearly arranged full cone nozzles are arranged such that in operation the circular full cone spray patterns of the individual full cone nozzles of the linearly arranged full cone nozzles do not overlap at the predetermined impact distance (d).

* * * * *